(12) United States Patent
Kwak

(10) Patent No.: US 9,191,663 B2
(45) Date of Patent: Nov. 17, 2015

(54) ORGANIC LIGHT EMITTING DISPLAY PANEL

(71) Applicant: SAMSUNG DISPLAY CO., LTD., Yongin, Gyeonggi-Do (KR)

(72) Inventor: Won-Kyu Kwak, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 13/934,129

(22) Filed: Jul. 2, 2013

(65) Prior Publication Data

US 2014/0240521 A1 Aug. 28, 2014

(30) Foreign Application Priority Data

Feb. 28, 2013 (KR) ........................ 10-2013-0022448

(51) Int. Cl.
*H04N 17/00* (2006.01)
*G09G 3/00* (2006.01)
*G09G 3/32* (2006.01)

(52) U.S. Cl.
CPC ............. *H04N 17/004* (2013.01); *G09G 3/006* (2013.01); *G09G 3/3208* (2013.01); *G09G 2300/0426* (2013.01); *G09G 2320/0223* (2013.01); *G09G 2330/04* (2013.01); *G09G 2330/12* (2013.01)

(58) Field of Classification Search
CPC ..................... G09G 2300/0842; G09G 3/3233; G09G 2320/043; G09G 2300/0861; G09G 2300/0819; G09G 300/0819; G09G 3/30; G09G 3/3688; G09G 3/3648; G09G 2330/021; G09G 2310/027; G09G 5/006; G09G 2300/0408

USPC .................. 345/76–79, 84, 90–92, 204, 206; 315/169.3; 324/403, 430, 324/760.01–760.02, 762.02–762.07
See application file for complete search history.

(56) References Cited

U.S. PATENT DOCUMENTS

| 6,111,621 | A * | 8/2000 | Kim et al. ........................ 349/54 |
| 2008/0313591 | A1 * | 12/2008 | Watanabe ........................ 716/10 |
| 2009/0045732 | A1 * | 2/2009 | Kwak et al. .................... 313/504 |
| 2009/0262048 | A1 * | 10/2009 | Park et al. ........................ 345/76 |
| 2011/0018571 | A1 * | 1/2011 | Kim et al. ................. 324/760.02 |

(Continued)

FOREIGN PATENT DOCUMENTS

| KR | 20-0168496 | 2/2000 |
| KR | 10-0581101 | 5/2006 |
| KR | 10-2007-0082324 | 8/2007 |
| KR | 10-0924142 | 10/2009 |

OTHER PUBLICATIONS

Korean Patent Abstract Publication No. 1999-0001413, dated Jan. 15, 1999, cited for KR20-0168496 listed above.

(Continued)

*Primary Examiner* — Md Saiful A Siddiqui
(74) *Attorney, Agent, or Firm* — Christie, Parker & Hale, LLP

(57) ABSTRACT

An organic light emitting display panel includes a display unit at crossing regions of scan lines and data lines, the display unit including a plurality of pixels configured to display different colors, the pixels being arranged in a pattern; a test circuit configured to apply a test signal to the plurality of pixels, the test circuit being coupled to one end of the data lines; and an auxiliary line adjacent to a plurality of signal lines for supplying the test signal to the test circuit and coupled to at least one of the plurality of signal lines.

17 Claims, 5 Drawing Sheets

(56) References Cited

U.S. PATENT DOCUMENTS

2011/0043500 A1* 2/2011 Kwak et al. .................. 345/206
2014/0084941 A1* 3/2014 Yun et al. ..................... 324/543

OTHER PUBLICATIONS

Korean Patent Abstract Publication No. 1020050067832 A, dated Jul. 5, 2005, cited for KR10-0581101 listed above.

* cited by examiner

ORGANIC LIGHT EMITTING DISPLAY PANEL

CROSS-REFERENCE TO RELATED APPLICATION

This application claims priority to and the benefit of Korean Patent Application No. 10-2013-0022448, filed on Feb. 28, 2013, in the Korean Intellectual Property Office, the disclosure of which is incorporated herein in its entirety by reference.

BACKGROUND

1. Field

Embodiments of the present invention relate to an organic light emitting display panel.

2. Description of the Related Art

An organic light emitting display panel uses organic light emitting diodes, which are self-light emitting diodes, to display an image. Because the organic light emitting display panel has excellent luminance and color purity, it has drawn attention as a next-generation display device.

The organic light emitting display device includes a plurality of red pixels, green pixels, and blue pixels, and thereby displays various color images.

When such organic light emitting display devices are manufactured, the organic light emitting display devices are tested in panel units or sheet units in order to improve the test efficiency so that a plurality of organic light emitting display panels are concurrently tested in a mother substrate state before scribing.

At this time, when a test signal is supplied to a test line, the testing may not be efficiently performed due to a waveform distortion caused by a voltage drop (IR drop) and a signal delay (RC delay).

SUMMARY

Embodiments of the present invention provide an organic light emitting display device that may include a pixel array structure to display high resolution images and to efficiently undergo panel testing.

According to an aspect of the present invention, there is provided an organic light emitting display panel including: a display unit at crossing regions of scan lines and data lines, the display unit including a plurality of pixels configured to display different colors, the pixels being arranged in a pattern; a test circuit configured to apply a test signal to the plurality of pixels, the test circuit being coupled to one end of the data lines; and an auxiliary line adjacent to a plurality of signal lines for supplying the test signal to the test circuit and coupled to at least one of the plurality of signal lines.

The auxiliary line may be located under a seal line of a non-display portion.

A width of the auxiliary line may be larger than a width of each of the signal lines.

The auxiliary line may include a first auxiliary line that extends along signal lines at a left side of the panel at a non-display portion and is coupled to one of the signal lines at a central part of an upper side of the panel, and a second auxiliary line that extends along the signal lines at a right side of the panel and is coupled to another one of the signal lines at a central part of the upper side of the panel.

An insulation film may be between the auxiliary line and the signal lines, and the auxiliary line and the signal lines may be coupled to each other through a contact hole.

The organic light emitting display panel may further include a static electricity preventer for preventing formation of static electricity between the first auxiliary line and the second auxiliary line.

The static electricity preventer may include a plurality of first diodes coupled in series in a forward direction and a plurality of second diodes coupled in series in a reverse direction.

The static electricity preventer may include a plurality of resistors coupled in series.

A first test signal for light emission of first pixels and a second test signal for light emission of second pixels may be alternately provided to one data line coupled to a pixel column, wherein the first pixels for displaying a first color and the second pixels for displaying a second color are alternately arranged, and wherein the first auxiliary line is coupled to a first signal line for supplying the first test signal from among the signal lines, and the second auxiliary line is coupled to a second signal line for supplying the second test signal, from among the signal lines.

The first pixel may be one of a red pixel and a blue pixel, and the second pixel may be another one of the red pixel and the blue pixel.

According to another aspect of the present invention, there is provided an organic light emitting display panel including: a display unit including first pixels, second pixels, and third pixels at crossing regions of scan lines and data lines, wherein the first pixels, the second pixels, and the third pixels are arranged in a pattern and are configured to display different colors; and a test circuit including a plurality of transistors coupled between the data lines and each of a first signal line that supplies a first test signal to the first pixels, a second signal line that supplies a second test signal to the second pixels, and a third signal line that supplies a third test signal to the third pixels, wherein the first signal line and the second signal line are dual lines coupled to an auxiliary line.

The auxiliary line may be located under a seal line.

A width of the auxiliary line may be larger than respective widths of the first signal line and the second signal line.

The first signal line, the second signal line, and the third signal line may be formed along a left side, an upper side and a right side of the panel in a non-display portion, wherein the auxiliary line includes a first auxiliary line that extends to a left and upper central part of the panel at the non-display portion and is coupled to the first signal line through a contact hole, and a second auxiliary line that extends to a right and upper central part of the panel and is coupled to the second signal line through a contact hole.

The organic light emitting display panel may further include: a static electricity preventer for preventing formation of static electricity between the first auxiliary line and the second auxiliary line.

The static electricity preventer may include a plurality of first diodes coupled in series in a forward direction and a plurality of second diodes coupled in series in a reverse direction.

The static electricity preventer may include a plurality of resistors coupled in series.

The display unit may include first pixel columns including first pixels and second pixels alternately arranged in parallel to the data line, second pixel columns including the first pixels and the second pixels arranged in an opposite order to that of the first pixel columns, and third pixel columns including the third pixels arranged in parallel to the data line.

The plurality of transistors may include: a first transistor coupled between the first signal line and first data lines configured to apply data signals to the first pixel columns; a second transistor coupled between the first data lines and the second signal line; a fourth transistor coupled between the second signal line and second data lines configured to apply data signals to the second pixel columns; a fifth transistor coupled between the first signal line and the second data lines; and a third transistor coupled between the third signal line and third data lines configured to apply data signals to the third pixel columns.

The first pixels may be ones of red pixels and blue pixels, the second pixels may be another ones of the red pixels and the blue pixels, and the third pixels may be green pixels.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
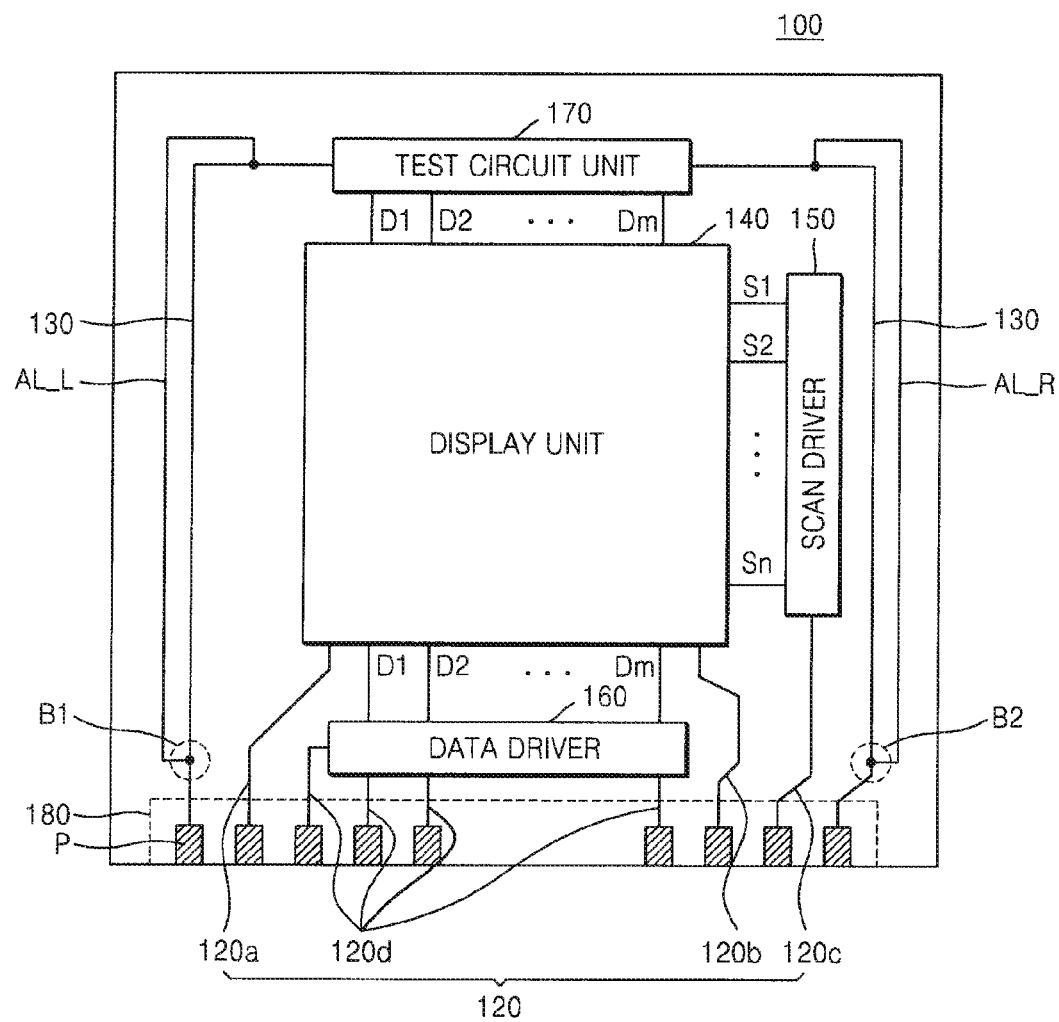
FIG. 1 is a plan view schematically illustrating an organic light emitting display panel according to an exemplary embodiment of the present invention.

As used herein, the term "and/or" includes any and all combinations of one or more of the associated listed items. Expressions such as "at least one of," when preceding a list of elements, modify the entire list of elements and do not modify the individual elements of the list.

Embodiments of the present invention will now be described more fully with reference to the accompanying drawings, in which exemplary embodiments of the invention are shown. The invention may, however, be embodied in many different forms and should not be construed as being limited to the embodiments set forth herein.

In order to clearly express several layers and areas, the size and thickness have been enlarged in the drawings. Furthermore, in the case where a position relationship between two items are described with the terms "on ~," "on the top of ~," or the like, one or more items may be interposed therebetween unless a description is given without the term "directly."

Furthermore, terms such as "including," "having," "consist of" may indicate a plurality of components unless the terms are used with the term "~only."

FIG. 1 is a plan view schematically illustrating an organic light emitting display panel 100 according to an exemplary embodiment of the present invention.

Referring to FIG. 1, the organic light emitting display panel 100 (hereinafter, referred to as "the panel 100") includes a display unit 140, a scan driver 150, a data driver 160, a test circuit unit (or test circuit) 170, and a pad unit 180.

The display unit 140 includes first pixels, second pixels, and third pixels which are positioned at crossing regions (e.g., crossings) of data lines D1 to Dm and scan lines S1 to Sn and configured to emit light of different colors. The data lines D1 to Dm extend in a first direction and the scan-lines S1 to Sn extend in a second direction.

The scan driver 150 generates scan signals in response to externally supplied scan driving power (VDD, VSS) and scan control signals (SCS), and sequentially supplies the scan signals to the scan lines S1 to Sn.

The data driver 160 is coupled to one end of the data lines D1 to Dm. The data driver 160 generates data signals in response to data DATA and data control signals (DCS), and supplies the data signals to the data lines D1 to Dm. The data driver 160 may be formed as an integrated circuit (IC) in an IC-mounted area.

Though not illustrated, the data driver 160 may include a switch unit including switching devices that electrically insulate the data driver 160 from the display unit 140 while a test of the panel 100 is performed. In another exemplary embodiment, the switch unit may be disposed (or located) between the display unit 140 and the data driver 160 separately from the data driver 160.

The test circuit unit 170 is coupled to the other end of the data lines D1 to Dm. The test circuit unit 180 receives DC test signals and DC test control signals and supplies the DC test signals corresponding to the DC test control signals to the data lines D1 to Dm while the panel 100 is examined (or tested).

The pad unit 180 includes a plurality of pads P for transmitting externally supplied power and/or signals to the organic light emitting display panel 100.

A non-display portion at the border (or edge) of the panel 100 includes a first line group 120, a second line group 130 and auxiliary lines (AL). The first line group 120, the second line group 130 and the auxiliary lines AL receive signals from the pad unit 180.

The first line group 120 may include a first line 120a that receives external first pixel power (or first power supply) (ELVDD) and transmits the first pixel power (ELVDD) to the display unit 140, a second line 120b that receives external second pixel power (or second pixel power) (ELVSS) and transmits the second pixel power (ELVSS) to the display unit 140, a third line 120c that receives external scan driving power (VDD, VSS) and scan control signals (SCS) and transmits the scan driving power (VDD, VSS) and the scan control signals (SCS) to the scan driver 150, and a plurality of fourth lines 120d that receive external data DATA and data control signals (DOS) and transmit the data DATA and the data control signals (DOS) to the data driver 160.

Although the third line 120c is illustrated as one line, the third line 120c may be composed of a plurality of lines. For example, the third line 120c may include five lines for receiving first scan driving power (VDD), second scan driving power (VSS), a start pulse as a scan control signal (SCS), a scan clock signal (CLK) and an output enable signal (OE).

The second line group 130 receives external test control signals and test signals and transmits the test control signals and the test signals to the test circuit unit 170. The second line group 130 is formed along the left side, upper side and right side of the panel 100 in the non-display portion, and is coupled to the pad unit 180 at the lower side. Although the second line group 130 is illustrated as one line, the second line group 130 may be composed of a plurality of lines. For example, the second line group 130 may include four lines for receiving a test control signal, a red test signal, a blue test signal, and a green test signal, respectively.

The testing of the panel 100 may include a lighting test, a leakage current test, and/or an aging test of the panel 100. The test may be performed by supplying a test signal to the data lines D1 to Dm through the test circuit unit 170 in a state where the data driver 160 is in an off state. The test signal is a signal for conducting the lighting test, the leakage current test, and the aging test.

The auxiliary lines (AL) are arranged to be adjacent to the second line group 130 along the second line group 130, and are formed at left and right sides of the panel 100. Both ends of the auxiliary lines AL are coupled to the second line group 130 through a contact hole. The auxiliary lines AL may include a left auxiliary line AL (AL_L) coupled to a one line (or a first line) of the second line group 130 at the upper central part of the panel 100, and a right auxiliary line AL (AL_R) coupled to an other one line (or a second line) of the second line group 130 at the upper central part of the panel 100.

The left auxiliary line AL (AL_L) may extend to the left and upper central part of the panel 100 and may be coupled to the line that receives the red test signal of the second line group 130. The right auxiliary line AL (AL_R) may extend to the right and upper central part of the panel 100 and may be coupled to the line that receives a blue test signal of the second line group 130. In another exemplary embodiment, the left auxiliary line AL (AL_L) may be coupled to the line that receives the blue test signal of the second line group 130, and the right auxiliary line AL (AL_R) may be coupled to the line that receives the red test signal of the second line group 130.

The auxiliary lines AL overlap a seal line (not shown) formed at the border of the non-display portion and may be arranged under the seal line. Hence, the auxiliary lines AL may be formed in the existing non-display portion without affecting the aperture ratio of the display unit 140 without an additional extension of the non-display portion. Furthermore, the auxiliary lines AL may be arranged on the lower part of the seal line and may increase the valid seal width at the time of laser sealing.

Furthermore, though not illustrated, the panel 100 according to an exemplary embodiment of the present invention may further include a light emitting controller for applying a light control signal to the display unit 140 so that a sufficient number of test signals may be applied to the first pixels, the second pixels, and the third pixels at the time of conducting the lighting test of the first pixels, the second pixels, and the third pixels.

Figure 2:
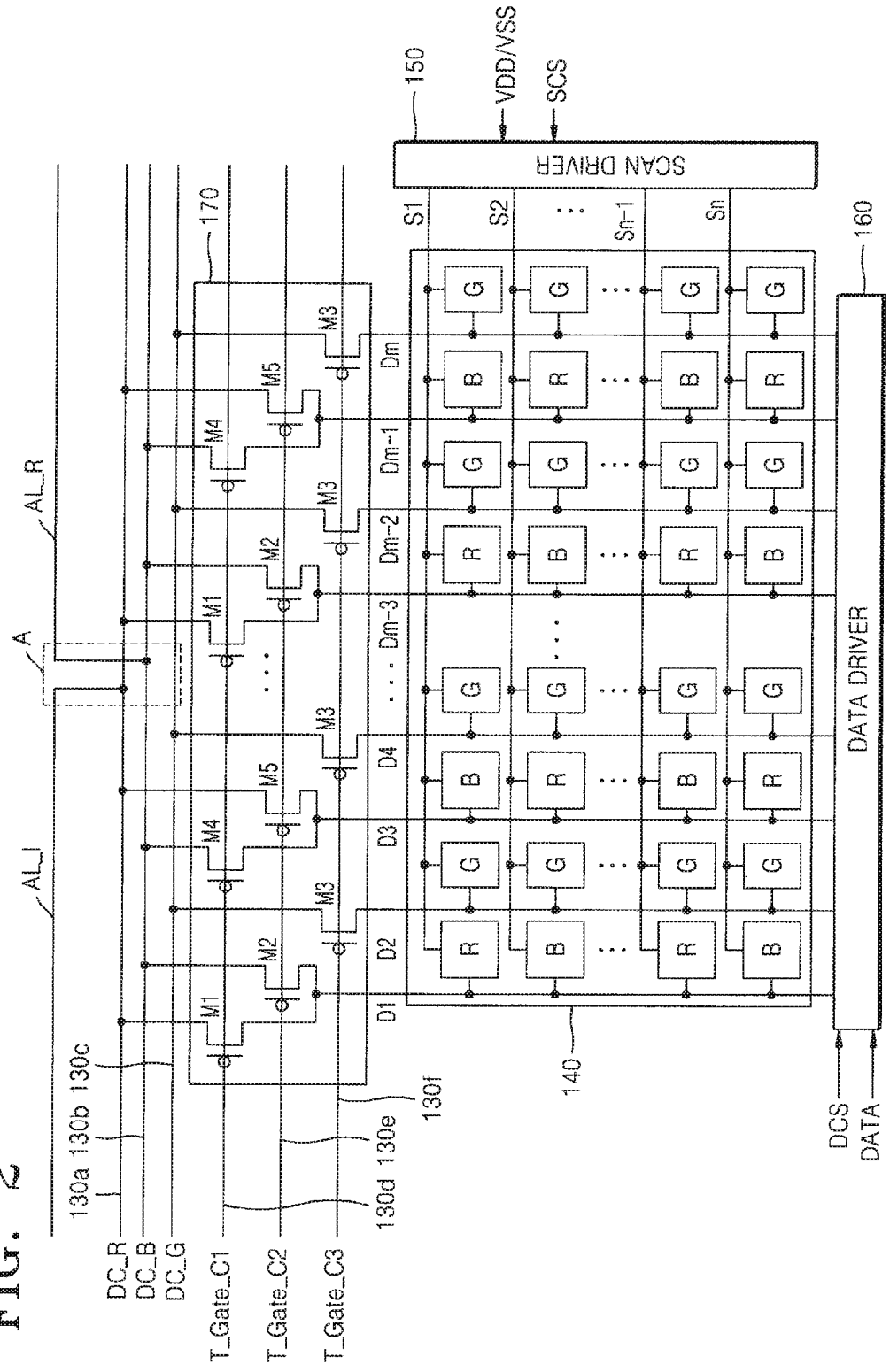
FIG. 2 is a plan view illustrating an example of a display unit and a test circuit unit illustrated in FIG. 1.

FIG. 2 is a plan view illustrating an example of the display unit and the test circuit unit illustrated in FIG. 1.

Referring to FIG. 2, the display unit 140 includes the first pixels, second pixels, and third pixels that emit light of different colors, the first pixels and the second pixels are alternately arranged along the same column, and the third pixels are arranged (e.g., linearly arranged) along a column adjacent to the column where the first and second pixels are arranged.

The first pixels may be red pixels R emitting red light, the second pixels may be blue pixels B emitting blue light, and the third pixels may be green pixels G emitting green light.

The red pixels R and the blue pixels B are alternately arranged along the same column, and the green pixels G, which are pixels of a color sensitive to the resolution, are arranged along a column adjacent to the column where the red pixels R and the blue pixels B are arranged.

The red pixels R and the blue pixels B are respectively positioned in a diagonal direction in the form of a check board. That is, the red pixels R and the blue pixels B are alternately arranged such that the same color pixel is not repeatedly arranged on the same column at two adjacent lines.

Furthermore, the green pixels G have a width smaller than those of the red pixels R and the blue pixels B along a horizontal axis, but the number of the green pixels G may be twice the number of either the red pixels R or the blue pixels B, respectively. For example, the green pixels G may be formed to have a width that is half of the width of the red pixels R and the blue pixels B along the horizontal line, but the number of the green pixels G may be twice the number of either the red pixels R or the blue pixels B. However, embodiments of the present invention are not limited thereto, and the area and the width of the red pixels R, the blue pixels B and the green pixels G may be changed in consideration of the life span of the materials, etc.

If the above-described pixel array structure is used, high resolution images may be obtained by a "sub-pixel rendering" scheme with regard to the number of pixels (R, G, B) in the display unit 140.

In the current exemplary embodiment of the present invention, the display unit 140 is composed of the red pixels R, the blue pixels B, and the green pixels G. However, the display unit 140 may further include pixels (not shown) for displaying colors other than red, green, and blue.

In the current exemplary embodiment of the present invention, the red pixels R and the blue pixels B positioned on the same column share one data line. That is, first data lines D1, D3, . . . , Dm−1 are arranged at the column where the red pixels R and the blue pixels B are alternately arranged, and second data lines D2, D4, . . . , Dm are arranged at the column where the green pixels G are arranged.

One end of each of the data lines D1 to Dm is coupled to the data driver 160, and the other end of each of the data lines D1 to Dm is coupled to the test circuit unit 170.

The data driver 160 is supplied with control signals (DCS) to maintain an off state from the pad unit 180 while testing of the panel 100 is performed. The off state is maintained according to the supplied control signal (DCS). The data driver 160 transmits data signals to data lines D1 to Dm while maintaining an on state corresponding to another control signal supplied from the pad unit 180 during a driving period when the test of the panel 100 is completed and the panel displays an image.

The first data lines D1, D5, . . . , Dm−3 are arranged at the first column where the red pixels R and the blue pixels B are alternately arranged. The second data lines D3, D7, . . . , Dm−1 are arranged at the second column where the red pixels R and the blue pixels B are arranged in an order opposite to that of the first column. The third data lines D2, D4, . . . , Dm are arranged at the third column where the green pixels G are arranged.

The test circuit unit 170 includes a plurality of transistors M1 to M5 coupled to the other end of each of the data lines D1 to Dm. Specifically, the test circuit unit 170 includes first transistors M1 coupled between respective first data lines D1, D5, . . . , Dm−3 and the first signal line 130a, second transistors M2 coupled between respective first data lines D1, D5, . . . , Dm−3 and the second signal line 130b, fourth transistors M4 coupled between respective second data lines D3, D7, . . . , Dm−1 and the second signal line 130b, fifth transistors M5 coupled between respective second data lines D3, D7, . . . , Dm−1 and the first signal line 130a, and third transistors coupled between respective third data lines D2, D4, . . . , Dm and the third signal line 130c. The first signal line 130a, the second signal line 130b and the third signal line 130c are signal lines included in the second line group 130 and are lines that are respectively supplied with red test signals DC_R, blue test signals DC_B, and green test signals DC_G in a direct current form while testing is performed. The red test signals DC_R, the blue test signals DC_B, and the green test signals DC_G are supplied to respective data lines D1 to DM through the test circuit unit 170.

The gate electrodes of the first transistors M1 and the fourth transistors M4 are commonly coupled to a first control line 130d, the gate electrodes of the second transistors M2 and the fifth transistors M5 are commonly coupled to a second control line 130e, and the gate electrodes of the third transistors M3 are commonly coupled to a third control line 130f. The first control line 130d, the second line 130e, and the third control line 130f are signal lines included in the second line group 130, and are supplied with a first test control signal (T_Gate_C1), a second test control signal (T_Gate_C2), and a third test control signal (T_Gate_C3), respectively.

As illustrated in the current embodiment of the present invention, all of first to fifth transistors M1 to M5 are PMOS transistors, however, the first to fifth transistors M1 to M5 may be NMOS transistors or some of the first to fifth transistors M1 to M5 may be PMOS transistors while others of the first to fifth transistors M1 to M5 are NMOS transistors.

The first signal line 130a is coupled to a left auxiliary line AL (AL_L), and the first signal line 130a is formed by dual lines. The second signal line 130b is coupled to a right auxiliary line AL (AL_R), and is formed by dual lines.

The red pixels R and the blue pixels B are coupled to one data line, and thus, as the first transistor M1 and the fourth transistor M4, and the second transistor M2 and the fifth transistor M5 are alternately turned on/off, the red test signals DC_R and the blue test signals DC_B are respectively supplied to the red pixels R and the blue pixels B.

In general, as the resolution increases, the capacitance and resistance of the red pixels R and the blue pixels B increase. As such, during lighting testing, red data and blue data are mixed, and thus, it is difficult to correctly evaluate the state of the panel 100. If lighting is tested by reducing the driving frequencies, the actual panel state may not be accurately determined.

In the present embodiment, the first signal line 130a, the second signal line 130b and third signal line 130c are arranged on the left and right sides of the panel 100, and the first signal line 130a and the second signal line 130b for supplying the red test signals DC_R and the blue test signals DC_B to the red pixels R and the blue pixels B, respectively, and coupled to one data line, are formed as dual lines, thereby reducing a line resistance. Furthermore, the line resistance may be significantly reduced by forming the width of the auxiliary line (AL), which is respectively coupled to the first signal line 130a and the second signal line 130b, wider than those of the first signal line 130a and the second signal line 130b.

As such, distortion of the waveform by a voltage drop (IR drop) and signal delay (RC delay) may be reduced (or prevented) when the panel 100 is tested. Hence, the luminance and color coordination of the panel may become uniform, and thus, the testing and aging process may be efficiently performed.

The test control signals (T_Gate) in a direct current form for controlling the first to fifth transistors M1 to M5 to maintain a turn-on state while the panel 100 is tested, are supplied to the gate electrodes of the first to fifth transistors M1 to M5. As such, while the first to fifth transistors M1 to M5 are maintained in an on-state, the first to fifth transistors M1 to M5 supply the red test signal DC_R, the blue test signal DC_B, and the green test signal DC_G from the first to third signal lines 130a, 130b and 130c, to the first data lines D1, D5, . . . , Dm−3, the second data lines D3, D7, . . . , Dm−1 and the third data lines D2, D4, . . . , Dm.

Furthermore, first scan driving power (VDD), second scan driving power (VSS) and a scan control signal (SCS) are supplied to the scan driver 150. Then, the scan driver 150 sequentially generates scan signals and supplies the scan signals to the display unit 140. Thus, pixels which receive scan signals and test signals emit light and display an image, and thus, lighting testing, etc. may be performed.

After testing of the panel 100 is terminated, bias signals for allowing the first to fifth transistors M1 to M5 to maintain a turn-off state are supplied to the control lines 130d, 130e, and 130f from the pad unit 180.

Figure 3:
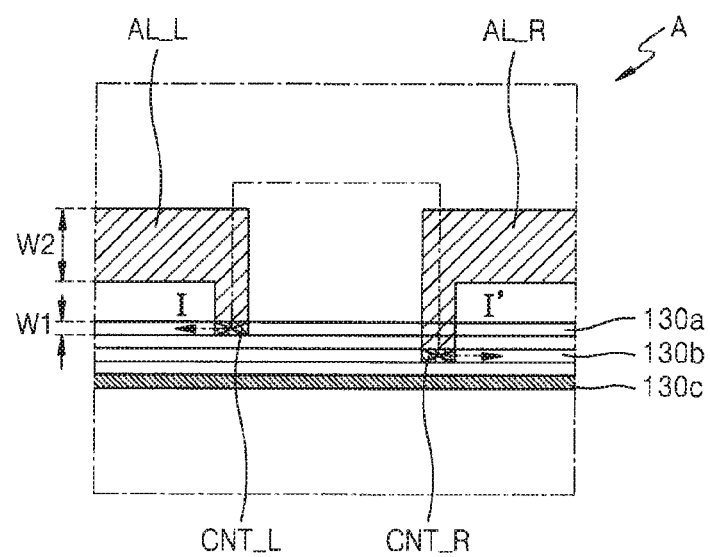
FIG. 3 is an enlarged plan view of area A shown in FIG. 2.
Figure 4:
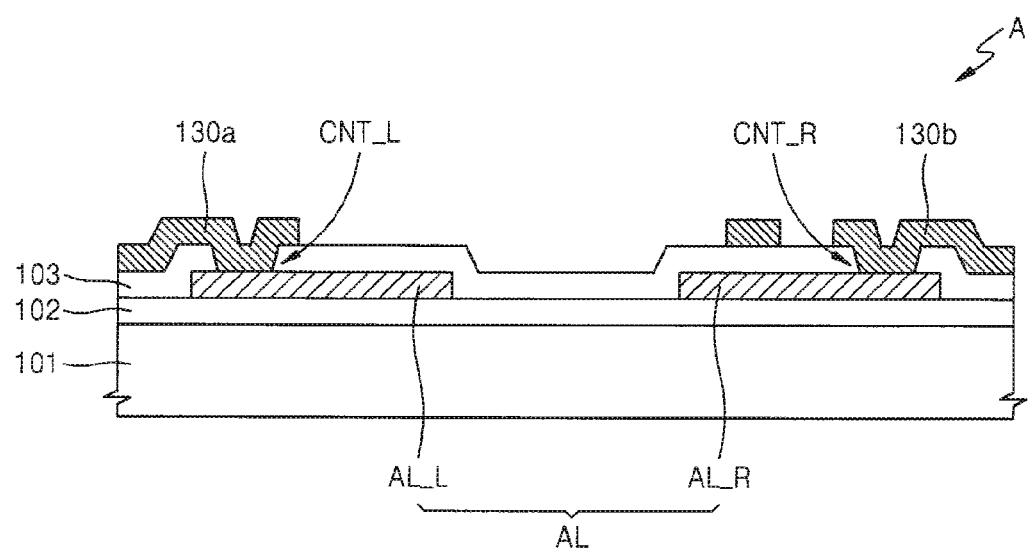
FIG. 4 is a cross-sectional view taken along the line I-I' of FIG. 3.

FIG. 3 is an enlarged plan view of area A shown in FIG. 2. FIG. 4 is a cross-sectional view taken along the line I-I' shown in FIG. 3.

Referring to FIGS. 3 and 4, a first insulation layer 102 is formed on a substrate 101, and a left auxiliary line (AL_L) and a right auxiliary line (AL_R) are formed on a non-display portion at the border of the substrate 101 on the first insulation layer 102. The left auxiliary line AL (AL_L) extends along the left side of the non-display portion up to the central part of the upper side of the non-display portion. The right auxiliary line AL (AL_R) extends along the right side of the non-display portion up to the central part of the upper side of the non-display portion. The left auxiliary line AL (AL_L) and the right auxiliary line AL (AL_R) may be formed at the same layer and of the same material as the gate electrode of a thin film transistor formed at each pixel of the display unit 140.

Next, a second insulation layer 103 is formed on the auxiliary lines AL. A left contact hole (CNT_L) that exposes part of the left auxiliary line AL (AL_L) and a right contact hole (CNT_R) that exposes part of the right auxiliary line AL (AL_R) are formed at the second layer 103 in the central part of the upper side of the panel 100.

A second line group 130 including a first signal line 130a, a second signal line 130b, and a third signal line 130c is formed on the second insulation layer 103. The first signal line 130a and the second signal line 130b are coupled to the auxiliary lines AL in the central part of the upper side of panel 100. The first signal line 130a is electrically coupled to the left auxiliary line AL (ALL) by contacting the line of (or projected from) the left auxiliary line AL (AL_L) through the left contact hole (CLT_L). The second signal line 130b is electrically coupled to the right auxiliary line AL (AL_R) by contacting the line of (or projected from) the right auxiliary line AL (AL_R) through the right contact hole (CNT_R). The first signal line 130a and the second signal line 130b may be formed at the same layer and of the same material as the source/drain electrodes of a thin film transistor formed at each pixel of the display unit 140.

The width W2 of the auxiliary lines AL may be formed to be wider than the width W1 of the first signal line 130a and/or the second signal line 130b. For example, the width W1 of the first signal line 130a and/or the second signal line 130b may be about 12 μm, and the width W2 of the auxiliary lines AL may be about 750 μm, thereby reducing the line resistance up to about ⅙ of the original resistance. As such, the generation of mixed color during lighting testing may be reduced (or prevented) by reducing (or minimizing) the resistance of the first signal line 130a and/or the second signal line 130b.

In the present embodiment, although the first signal line 130a is coupled to the left auxiliary line AL (AL_L) and the second signal line 130b is coupled to the right auxiliary line AL (AL_R), embodiments of the present invention are not limited thereto. Thus, the first signal line 130a may be coupled to the right auxiliary line AL (AL_R) and the second signal line 130b may be coupled to the left auxiliary line AL (AL_L).

Figure 5:
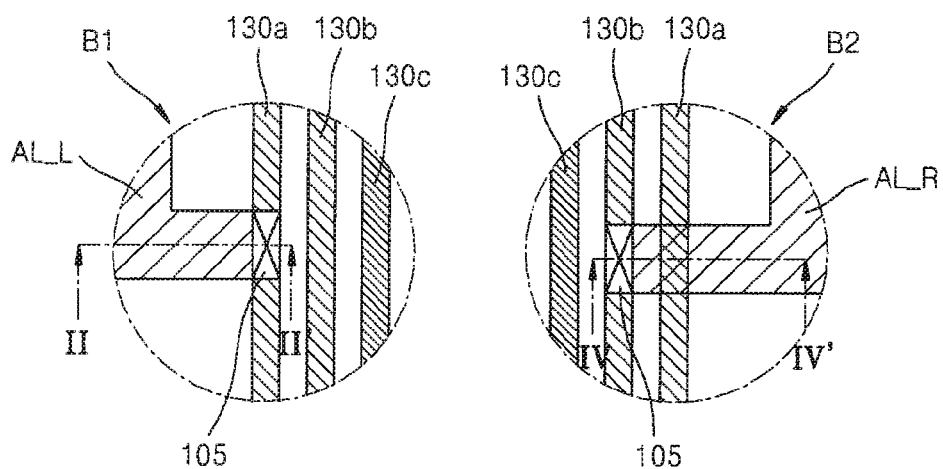
FIG. 5 is an enlarged plan view of area B1 and area B2 shown in FIG. 1.
Figure 6:
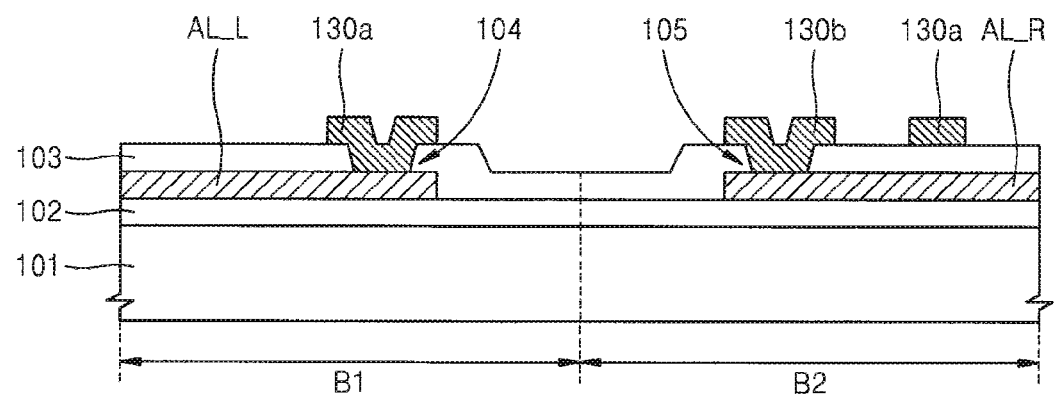
FIG. 6 is a cross-sectional view taken along the lines II-II' and IV-IV' shown in FIG. 5.

FIG. 5 is an enlarged plan view of area B1 and area B2 shown in FIG. 1, and FIG. 6 is a cross-sectional view taken along the lines II-II' and IV-IV' shown in FIG. 5.

FIGS. 5 and 6 are different from FIGS. 2 and 3 in that in FIGS. 5 and 6 the first signal line 130a and the second signal line 130b are respectively coupled to the auxiliary lines AL at a portion where the first signal line 130a and the second signal line 130b of the left and right sides of the panel 100 extend from the pad unit 180.

Referring to FIGS. 5 and 6, the first insulation layer 102 is formed on the substrate 101, and the left auxiliary line AL (AL_L) and the right auxiliary line AL (AL_R) are formed on the first insulation layer 102 at the non-display portion at the border of the substrate 101. The left auxiliary line AL (AL_L) extends along the left side of the non-display portion up to the central part of the upper side of the non-display portion. The right auxiliary line AL (AL_R) extends along the right side of the non-display portion up to the central part of the upper side of the non-display portion. The auxiliary lines AL may be formed at the same layer and of the same material as the gate electrode of a thin film transistor formed at each pixel of the display unit 140.

Next, a second insulation layer 103 is formed on the auxiliary lines AL. A contact hole 104 that exposes part of the left auxiliary line AL (AL_L) and a contact hole 105 that exposes part of the right auxiliary line AL (AL_R) are formed at the second insulation layer 103.

The second line group 130 including the first signal line 130a, the second signal line 130b, and the third signal line 130c are formed on the second insulation layer 103. The first signal line 130a is electrically coupled to the left auxiliary line AL (AL_L) by contacting the left auxiliary line AL (AL_L) through the contact hole 104 at the lower left side of the non-display unit. The second signal line 130b is electrically coupled to the right auxiliary line AL (AL_R) by contacting the right auxiliary line AL (AL_R) through the contact hole 105 at the lower right side of the non-display portion. The first signal line 130a and the second signal line 130b may be formed at the same layer and of the same material as the source/drain electrodes of a thin film transistor formed at each pixel of the display unit 140.

Figure 7:
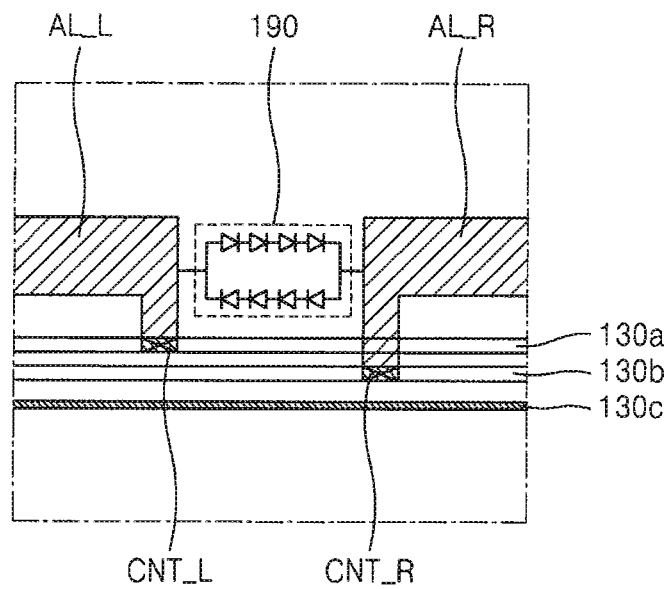
FIGS. 7 and 8 are enlarged plan views of area A shown in FIG. 2 according to another exemplary embodiment of the present invention.

FIG. 7 is an enlarged plan view of area A shown in FIG. 2 according to another exemplary embodiment of the present invention.

Referring to FIG. 7, a static electricity prevention unit (or static electricity preventer) 190 is provided between the left auxiliary line AL (AL_L) and the right auxiliary line AL (AL_R) for reducing (or preventing) formation of static electricity by the auxiliary lines AL.

The static electricity prevention unit 190 may be formed of a plurality of diodes generated by a parallel connection of first and second diodes. The first diodes are coupled in series in a forward direction between the left auxiliary line AL (AL_L) and the right auxiliary line AL (AL_R), while the second diodes are coupled in series in a reverse direction between the left auxiliary line AL (AL_L) and the right auxiliary line AL (AL_R). The static electricity prevention unit 190 reduces (or prevents) static electricity from flowing into devices (or elements) of the display unit 140 and affecting them.

If static electricity is generated, the static electricity prevention unit 190 may reduce (or prevent) the static electricity as the left auxiliary line AL (AL_L) and the right auxiliary line AL (AL_R) become equipotential by the plurality of diodes. Furthermore, even if a resistance reduction occurs in a forward direction due to a decrease of characteristics of diodes, a large forward direction resistance is formed between the left auxiliary line AL (AL_L) and the right auxiliary line AL (AL_R) due to the plurality of diodes coupled in both directions, and thus, test signals supplied to the left auxiliary line AL (AL_L) and the right auxiliary line AL (AL_R) may not change.

Figure 8:
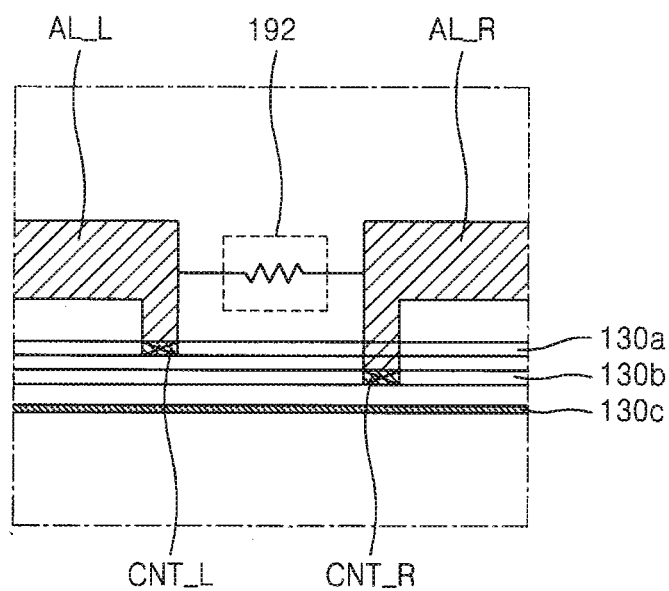

FIG. 8 is an enlarged plan view of area A shown in FIG. 2 according to another exemplary embodiment of the present invention.

Referring to FIG. 8, a static electricity prevention unit (or static electricity preventer) 192 is provided between the left auxiliary line AL (AL_L) and the right auxiliary line AL (AL_R) for reducing (or preventing) formation of static electricity by the auxiliary lines AL.

The static electricity prevention unit 192 is formed by a plurality of resistors coupled in series, and if static electricity is generated, the static electricity prevention unit 192 may discharge the static electricity through the plurality of resistors so that the static electricity flowing into the devices (or elements) of the display unit 140 and affecting them is reduced (or prevented).

If static electricity is generated, the static electricity is discharged via the resistors.

The static electricity prevention unit 192 may be formed of a metal line having a high resistance or may be formed of a semiconductor layer and a gate electrode formed at the upper side of the semiconductor layer. In the latter case, an insulation film may be placed between the semiconductor layer and the gate electrode. Both ends of the semiconductor layer may be coupled through the left auxiliary line AL (AL_L), the right auxiliary line AL (AL_R) and a contact hole. The semiconductor layer may have a large resistance by having bending portions without having to undergo ion doping.

Embodiments of the present invention disclose a pixel array structure having high resolution and including first pixels and second pixels alternately arranged on the same column. Because lines that supply a test signal of a direct current form to the first pixels and the second pixels that are coupled to one data line are double line structure, efficient testing of the display panel is possible.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. An organic light emitting display panel comprising:
   a display unit at crossing regions of scan lines and data lines, the display unit comprising a plurality of pixels configured to display different colors, the pixels being arranged in a pattern;
   a test circuit at a first side of the panel, the first side being opposite to a side of the panel having a data driver, the test circuit being coupled to one end of the data lines and to a plurality of test signal lines; and
   an auxiliary line adjacent to the plurality of test signal lines and coupled to at least one of the plurality of test signal lines,
   wherein the auxiliary line comprises:
   a first auxiliary line that extends along the test signal lines at a second side of the panel, the second side being a left side of the panel, and is coupled to one of the test signal lines at a central part of the first side of the panel, at a non-display portion; and
   a second auxiliary line that extends along the test signal lines at a third side of the panel, the third side being a right side of the panel, and is coupled to another one of the test signal lines at a central part of the first side of the panel, at a non-display portion, wherein a first test signal for light emission of first pixels and a second test signal for light emission of second pixels are alternately provided to one data line coupled to a pixel column, wherein the first pixels for displaying a first color and the second pixels for displaying a second color are alternately arranged, wherein the first auxiliary line is directly coupled to a first test signal line for supplying the first test signal from among the test signal lines, and wherein the second auxiliary line is directly coupled to a second test signal line for supplying the second test signal, from among the test signal lines.

2. The organic light emitting display panel of claim 1, wherein the auxiliary line is located under a seal line of a non-display portion.

3. The organic light emitting display panel of claim 1, wherein a width of the auxiliary line is larger than a width of each of the test signal lines.

4. The organic light emitting display panel of claim 1, wherein an insulation film is between the auxiliary line and the test signal lines, and the auxiliary line and the test signal lines are coupled to each other through a contact hole.

5. The organic light emitting display panel of claim 1, further comprising
a static electricity preventer for preventing formation of static electricity between the first auxiliary line and the second auxiliary line.

6. The organic light emitting display panel of claim 5, wherein the static electricity preventer comprises a plurality of first diodes coupled in series in a forward direction and a plurality of second diodes coupled in series in a reverse direction.

7. The organic light emitting display panel of claim 5, wherein the static electricity preventer comprises a plurality of resistors coupled in series.

8. The organic light emitting display panel of claim 1, wherein both ends of the auxiliary line are respectively coupled to different locations of the at least one of the plurality of test signal lines.

9. An organic light emitting display panel comprising:
a display unit comprising first pixels, second pixels, and third pixels at crossing regions of scan lines and data lines, wherein the first pixels, the second pixels, and the third pixels are arranged in a pattern and are configured to display different colors; and
a test circuit at a first side of the panel, the first side being opposite to a side of the panel having a data driver, comprising a plurality of transistors coupled between the data lines and each of a first test signal line that supplies a first test signal to the first pixels, a second test signal line that supplies a second test signal to the second pixels, and a third test signal line that supplies a third test signal to the third pixels, wherein the first test signal line and the second test signal line are dual lines coupled to an auxiliary line, wherein the first test signal line, the second test signal line, and the third test signal line are formed along a second side of the panel, the second side being a left side of the panel, the first side, and a third side of the panel, the third side being a right side of the panel, at a non-display portion, and wherein the auxiliary line comprises:
a first auxiliary line that extends along the second side and a part of the first side of the panel at the non-display portion and is directly coupled to the first test signal line through a contact hole at a central part of the first side, and
a second auxiliary line that extends along the third side and a part of the first side of the panel and is directly coupled to the second test signal line through a contact hole at the central part of the first side.

10. The organic light emitting display panel of claim 9, wherein the auxiliary line is located under a seal line.

11. The organic light emitting display panel of claim 9, wherein a width of the auxiliary line is larger than a width of first test signal line and the second test signal line.

12. The organic light emitting display panel of claim 9, further comprising
a static electricity preventer for preventing formation of static electricity between the first auxiliary line and the second auxiliary line.

13. The organic light emitting display panel of claim 12, wherein the static electricity preventer comprises a plurality of first diodes coupled in series in a forward direction and a plurality of second diodes coupled in series in a reverse direction.

14. The organic light emitting display panel of claim 12, wherein the static electricity preventer comprises a plurality of resistors coupled in series.

15. The organic light emitting display panel of claim 9, wherein the display unit comprises first pixel columns comprising first pixels and second pixels alternately arranged in parallel to the data line, second pixel columns comprising the first pixels and the second pixels arranged in an opposite order to that of the first pixel columns, and third pixel columns comprising the third pixels arranged in parallel to the data line.

16. The organic light emitting display panel of claim 15, wherein the plurality of transistors comprises:
a first transistor coupled between the first test signal line and first data lines configured to apply data signals to the first pixel columns;
a second transistor coupled between the first data lines and the second test signal line;
a fourth transistor coupled between the second test signal line and second data lines configured to apply data signals to the second pixel columns;
a fifth transistor coupled between the first test signal line and the second data lines; and
a third transistor coupled between the third test signal line and third data lines configured to apply data signals to the third pixel columns.

17. The organic light emitting display panel of claim 9, wherein the first pixels are ones of red pixels and blue pixels, the second pixels are another ones of the red pixels and the blue pixels, and the third pixels are green pixels.

* * * * *